（12）United States Patent
Kim et al.

(10) Patent No.: US 8,305,058 B2
(45) Date of Patent: Nov. 6, 2012

(54) POWER SUPPLY HAVING AN IMPROVED MAXIMUM POWER POINT TRACKING FUNCTION

(75) Inventors: Jin Wook Kim, Seoul (KR); Sung Soo Hong, Gyunggi-do (KR); Sang Kyoo Han, Daejeon (KR); Chung Wook Roh, Seoul (KR); Jong Sun Kim, Gyunggi-do (KR); Sang Hun Lee, Gyunggi-do (KR); Jae Sun Won, Gyunggi-do (KR); Dong Seong Oh, Incheon (KR); Jong Hae Kim, Gyunggi-do (KR)

(73) Assignee: Samsung Electro-Mechanics Co., Ltd., Gyunggi-do (KR)

( * ) Notice: Subject to any disclaimer, the term of this patent is extended or adjusted under 35 U.S.C. 154(b) by 971 days.

(21) Appl. No.: 12/262,209

(22) Filed: Oct. 31, 2008

(65) Prior Publication Data
US 2009/0316447 A1    Dec. 24, 2009

(30) Foreign Application Priority Data

Jun. 23, 2008   (KR) .................. 10-2008-0059286

(51) Int. Cl.
  *G05F 1/40* (2006.01)
  *G05F 1/44* (2006.01)
  *G05F 1/56* (2006.01)
(52) U.S. Cl. ........ 323/282; 323/284; 323/285; 323/222; 323/223
(58) Field of Classification Search .............. 323/282, 323/284, 285, 222, 223
  See application file for complete search history.

(56) References Cited

U.S. PATENT DOCUMENTS 5,869,956 A * 2/1999 Nagao et al. .............. 323/299

5,923,158 A * 7/1999 Kurokami et al. .......... 323/299

(Continued)

FOREIGN PATENT DOCUMENTS

KR    1994-008141 A1    4/1994

(Continued)

OTHER PUBLICATIONS

KR Office Action for application No. 10-2008-0059286, issued Apr. 29, 2010.

*Primary Examiner* — Bao Q Vu
(74) *Attorney, Agent, or Firm* — Lowe, Hauptman, Ham & Berner, LLP

(57) ABSTRACT

The present invention relates to power supplies, and more particularly, to a power supply having a maximum power point tracking function that can reduce manufacturing costs and circuit size by using a maximum power point tracking section with a simplified circuit in a solar photovoltaic power generator supplying power using sunlight instead of using a micro controller, the maximum power point tracking section that controls power switching according to a result of integration of a value obtained by dividing a power variation by a voltage variation to track a maximum power value. A power supply having a maximum power point tracking function according to an aspect of the invention may include: a converter section switching input power, and converting the switched input power into predetermined DC power; and a maximum power point tracking section detecting a voltage and a power value of the input power, dividing a variation of the detected power by a variation of the detected voltage, integrating a result of the division, and controlling the switching operation of the converter section according to a value of the integration.

7 Claims, 2 Drawing Sheets

U.S. PATENT DOCUMENTS

| | | | |
|---|---|---|---|
| 7,248,946 B2 * | 7/2007 | Bashaw et al. | 700/286 |
| 2003/0117822 A1 * | 6/2003 | Stamenic et al. | 363/132 |
| 2005/0254191 A1 * | 11/2005 | Bashaw et al. | 361/62 |
| 2006/0071327 A1 | 4/2006 | Parthasarathy et al. | |
| 2007/0290668 A1 * | 12/2007 | Chou et al. | 323/299 |
| 2008/0203994 A1 * | 8/2008 | Park | 323/318 |
| 2008/0278983 A1 * | 11/2008 | Park | 363/95 |
| 2010/0265747 A1 * | 10/2010 | Egiziano et al. | 363/132 |

FOREIGN PATENT DOCUMENTS

| | | |
|---|---|---|
| KR | 1020070078092 A | 7/2007 |
| KR | 2007-0078524 A | 8/2007 |
| KR | 100757320 B1 | 9/2007 |

\* cited by examiner

POWER SUPPLY HAVING AN IMPROVED MAXIMUM POWER POINT TRACKING FUNCTION

CROSS-REFERENCE TO RELATED APPLICATIONS

This application claims the priority of Korean Patent Application No. 2008-0059286 filed on Jun. 23, 2008, in the Korean Intellectual Property Office, the disclosure of which is incorporated herein by reference.

BACKGROUND OF THE INVENTION

1. Field of the Invention

The present invention relates to power supplies, and more particularly, to a power supply having a maximum power point tracking function that can reduce manufacturing costs and circuit size by using a maximum power point tracking section with a simplified circuit in a solar photovoltaic power generator supplying power using sunlight instead of using a micro controller, the maximum power point tracking section that controls power switching according to a result of integration of a value obtained by dividing a power variation by a voltage variation to track a maximum power value.

2. Description of the Related Art

In general, power supplies that supply driving power to home equipment and industrial equipment are necessarily used to drive the equipment.

Recently, among the power supplies, solar photovoltaic power generators have received much attention as new alternative power supplies since they use infinite energy sources that are environment-friendly and will not be drained.

Though these solar photovoltaic power generators have attracted attention as new alternative energy supplies, they have low generation efficiency. Thus, the solar photovoltaic power generators necessarily require maximum power point tracking (MPPT) functions in order to extract maximum power.

A maximum power point at which a solar photovoltaic power generator extracts maximum power varies according to environmental conditions such as solar radiation and surface temperature. An operating point at which the solar photovoltaic power generator generates power is determined by load conditions.

Therefore, in order that the solar photovoltaic power generator extracts the power energy, the operating point needs to be controlled so that the operating point tracks the maximum power point.

However, in order that the operating point tracks the maximum power point, an expensive control device, such as a micro controller, is required, and a complicated peripheral circuit is further required for the control device, which causes an increase in manufacturing costs, and an increase in circuit size.

SUMMARY OF THE INVENTION

An aspect of the present invention provides a power supply having a maximum power point tracking function that can reduce manufacturing costs and circuit size by using a maximum power point tracking section with a simplified circuit instead of using a micro controller, the maximum power point tracking section that controls power switching according to a result of integration of a value obtained by dividing a power variation by a voltage variation to track a maximum power value.

According to an aspect of the present invention, there is provided a power supply having a maximum power point tracking function, the power supply including: a converter section switching input power, and converting the switched input power into predetermined DC power; and a maximum power point tracking section detecting a voltage and a power value of the input power, dividing a variation of the detected power by a variation of the detected voltage, integrating a result of the division, and controlling the switching operation of the converter section according to a value of the integration.

The maximum power point tracking section may include: an operator detecting a current and a voltage of the input power, and operating a voltage variation and a power variation from the detected voltage and current; and a switching controller comparing a predetermined reference signal with a value of the integration of the result obtained by dividing the power variation by the voltage variation, and controlling a switching-on duty ratio of the converter section according to a result of the comparison.

The operator may include: a multiplication unit multiplying the current and voltage detected from the input power to output power; a first sampling unit sampling the power from the multiplication unit; a first operation unit performing an operation of a power value sampled by the first sampling unit and a power value output from the multiplication unit to obtain a power variation; and a second sampling unit sampling the voltage detected from the input power; and a second operation unit performing an operation of a voltage value sampled by the second sampling unit and the detected voltage value to obtain a voltage variation.

The switching controller may include: a division unit dividing the power variation from the operator by the voltage variation; an integration unit integrating a result from the division unit; and a comparison unit supplying a switching control signal to increase a switching duty ratio of the converter section when the integration value from the integration unit is lower than a signal level of the reference signal, or a switching control signal to decrease a switching duty ratio when the integration value from the integration unit is higher than the signal level of the reference signal, wherein the reference signal may be a sawtooth wave having a predetermined signal level.

The converter section may include: an inductor boosting a voltage level of the input power; a switch switching the power from the inductor according to the switching control signal; a diode rectifying the power switched by the switch; a capacitor stabilizing the power rectified by the diode.

The power supply may further include: an inverter converting DC power from the converter section into predetermined AC power.

The first and second sampling units may sample the power value and the voltage value by using a sample and hold method.

The input power may be power input from a solar array, and the power supply may be a solar photovoltaic generator.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Exemplary embodiments of the present invention will now be described in detail with reference to the accompanying drawings.

Figure 1:
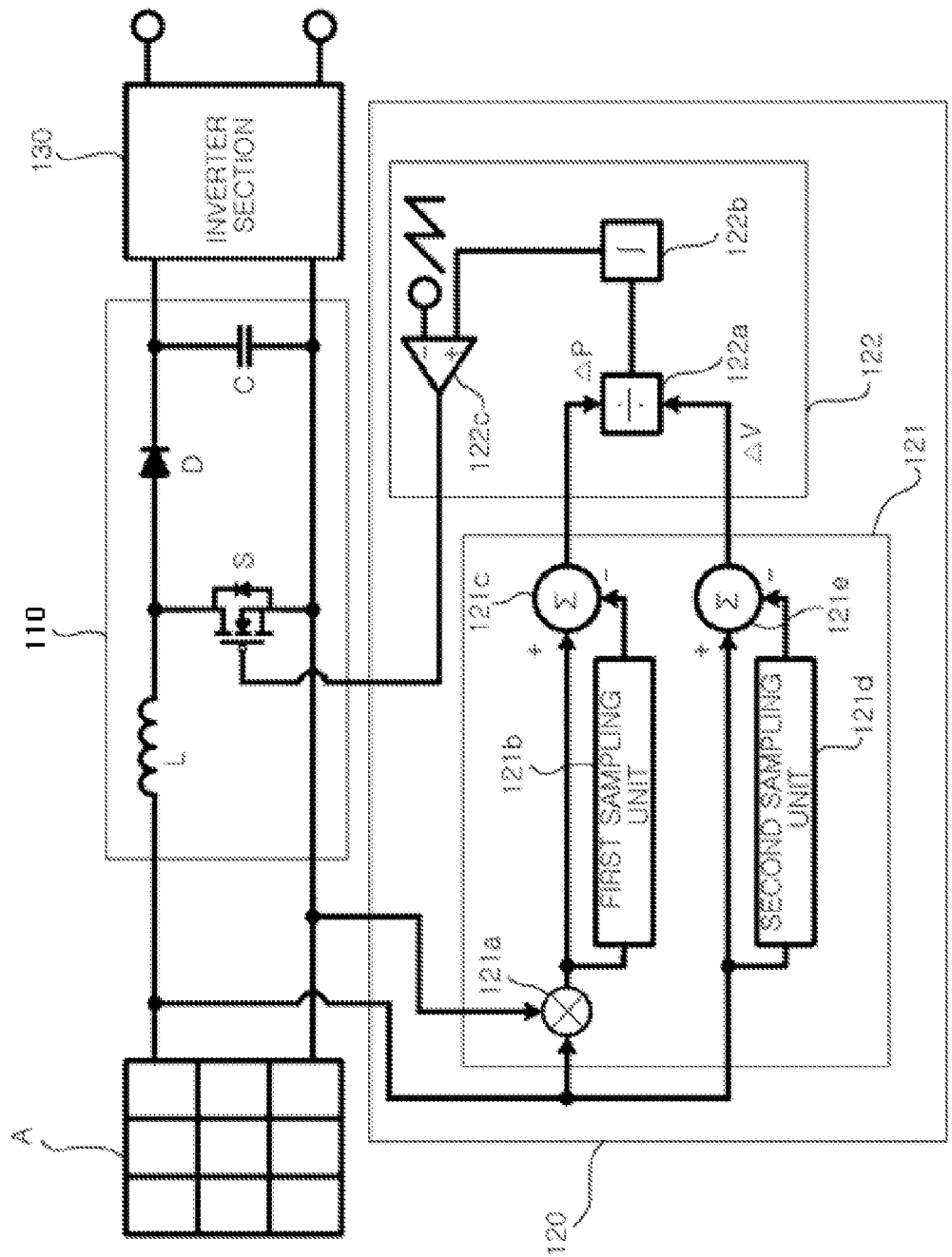
FIG. 1 is a configuration view illustrating a power supply according to an exemplary embodiment of the invention.

FIG. 1 is a configuration view illustrating a power supply according to an exemplary embodiment of the invention.

Referring to FIG. 1, a power supply 100 according to an exemplary embodiment of the invention includes a converter section 110 and a maximum power point tracking section 120. The power supply 100 according to the embodiment of the invention may be a solar photovoltaic power generator that converts power from a solar array A into commercial power.

The converter section 110 switches input power from the solar array A, and converts the switched input power into DC power having a predetermined voltage level.

To this end, the converter section 110 may include an inductor L, a switch S, a diode D, and a capacitor Co.

The inductor L boosts a voltage level of the power from the solar array A, and the switch S switches the power whose voltage level is boosted by the inverter L according to a switching control signal. The power switched by the switch S is rectified by the diode D, and the rectified power is stabilized by the capacitor Co.

Figure 2:
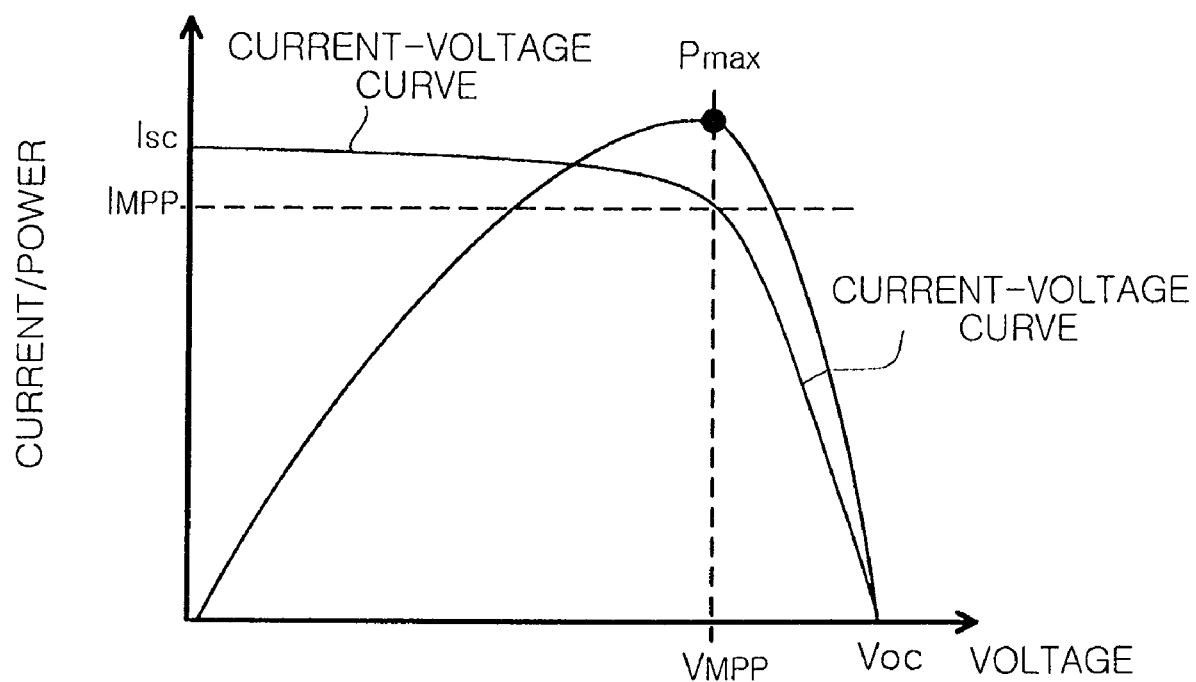
FIG. 2 is a current-voltage and voltage-power characteristic graph of a solar array used in the power supply according to the embodiment of the invention.

A current-voltage curve and a power-voltage curve of the solar array A are shown in FIG. 2.

In FIG. 2, a current-voltage characteristic curve and a power-voltage characteristic curve of a solar array are shown. Referring to the current-voltage characteristic curve of the solar array as shown in FIG. 2, a current is constant despite an increase in voltage, and then the current starts to decrease sharply at a predetermined voltage. On the other hand, in the power-voltage characteristic curve of the solar array, power increases with voltage, and then the power starts to decrease sharply at the maximum power point Pmax.

Referring to FIG. 1, the maximum power point tracking section 120 of the power supply 100 according to the embodiment of the invention may include an operator 121 and a switching controller 122. The operator 121 detects a current and avoltage from the solar array A, and performs an operation of a voltage variation and a power variation. The switching controller 122 divides the power variation from the operator 121 by the voltage variation, integrates the divided value, compares a result of the integration with a predetermined reference signal, and supplies a switching control signal used to control a switching-on duty ratio of the converter section 110 according to a result of the comparison.

Further, the power supply 100 according to the embodiment of the invention may further include an inverter section 130 that converts DC power from the converter section 110 into predetermined AC power. The AC power from the inverter section 130 may be commercial AC power used to drive electronic products including home appliances.

The operator 121, included in the maximum power point tracking section 120 of the power supply 100, includes a multiplication unit 121a, a first sampling unit 121b, and a first operation unit 121c. The multiplication unit 121a multiplies the current and the voltage detected from the solar array A. The first sampling unit 121b samples a power value from the multiplication unit 121a by a predetermined step number. The first operation unit 121c subtracts a power value sampled by the first sampling unit 121b from the power value of the multiplication unit 121a. A power variation ΔP from the first operation unit 121c is transmitted to the switching controller 122.

Further, the operator 121 includes a second sampling unit 121d and a second operation unit 121e. The second sampling unit 121d samples the voltage value detected from the solar array A by a predetermined step number. The second operation unit 121e subtracts the voltage value sampled by the second sampling unit 121d from the detected voltage value. A voltage variation ΔV from the second operation unit 121e is transmitted to the switching controller 122. The first or second sampling unit 121b or 121d may sample the voltage value or the power value by using a sample and hold method.

The switching controller 122 includes a division unit 122a and a comparison unit 122c. The division unit 122a divides the power variation ΔP from the operator 121 by the voltage variation ΔV to control the switching operation of the converter section 110. The integration unit 122b integrates a result of the division of the division unit 122a, compares a result of the integration of the integration unit 122b with the reference signal having a predetermined signal level, and controls the switching operation of the converter section 110 according to a result of the comparison.

The integration unit 122b integrates the result of the division of the division unit 122a according to the following equation:

$$d(t) = -k \int \frac{\partial p_s}{\partial v_s} dt, \qquad \text{Equation}$$

where K is a constant, $\partial p_s$ is a power variation, and $\partial v_s$ is a voltage variation.

The comparison unit 122c that receives the integration result from the integration unit 122b compares the integration 20 result with the level of the reference signal. Here, the reference signal may be a sawtooth wave having a predetermined signal level, and controls a switching-on duty ratio of the switch S of the converter section 110 according to a result of the comparison.

A switching duty ratio is determined according to the result of the division of the division unit 122a. When the division result is negative, the switching-on duty ratio is increased. When the division result is positive, the switching-on duty ratio is decreased.

Referring to FIG. 2, when the voltage output from the solar array A has a higher level than a voltage $V_{MPP}$ at the maximum power point Pmax, and a lower level than a voltage $V_{OC}$ at an initial operating point, the current from the solar array A is smaller than a current $I_{MPP}$ at the maximum power point Pmax. Therefore, by increasing the switching-on duty ratio of the switch S of the converter section 110, the current output from the solar array A is increased, such that the power supply 100 operates at the maximum power point Pmax.

On the contrary, when the voltage output from the solar array A has a lower level than the voltage $V_{MPP}$ at the maximum power point Pmax, the current from the solar array A is greater than the current $I_{MPP}$ at the maximum power point Pmax, and smaller than the maximum current $I_{SC}$. Therefore, by reducing the switching-on duty ratio of the switch S of the converter section 110, the current output from the solar array A is reduced, such that the power supply 100 operates at the maximum power point Pmax.

As described above, the maximum power point tracking section 120 according to the embodiment of the invention controls the switching-on duty ratio of the switch S of the converter section 110 according to the voltage variation and the power variation from the solar array A, so that the operating point of the power supply 100 tracks the maximum power point Pmax.

As set forth above, according to the exemplary embodiment of the invention, a power supply, more particularly, a power supply having a maximum power point tracking function can reduce manufacturing costs and circuit size by using a maximum power point tracking section with a simplified circuit in a solar photovoltaic power generator supplying power using sunlight instead of using a micro controller, the maximum power point tracking section that controls power switching according to a result of integration of a value obtained by dividing a power variation by a voltage variation to track a maximum power value.

While the present invention has been shown and described in connection with the exemplary embodiments, it will be apparent to those skilled in the art that modifications and variations can be made without departing from the spirit and scope of the invention as defined by the appended claims.

What is claimed is:

1. A power supply having a maximum power point tracking function, the power supply comprising:
    a converter section switching input power, and converting the switched input power into predetermined DC power; and
    a maximum power point tracking section detecting a voltage and a power value of the input power, dividing a variation of the detected power by a variation of the detected voltage, integrating a result of the division, and controlling the switching operation of the converter section according to a value of the integration, wherein the maximum power point tracking section comprises:
    an operator detecting a current and a voltage of the input power, and operating a voltage variation and a power variation from the detected voltage and current; and
    a switching controller comparing a predetermined reference signal with a value of the integration of the result obtained by dividing the power variation by the voltage variation, and controlling a switching-on duty ratio of the converter section according to a result of the comparison.

2. The power supply of claim 1, wherein the operator comprises:
    a multiplication unit multiplying the current and voltage detected from the input power to output power;
    a first sampling unit sampling the power from the multiplication unit;
    a first operation unit performing an operation of a power value sampled by the first sampling unit and a power value output from the multiplication unit to obtain a power variation; and
    a second sampling unit sampling the voltage detected from the input power; and
    a second operation unit performing an operation of a voltage value sampled by the second sampling unit and the detected voltage value to obtain a voltage variation.

3. The power supply of claim 1, wherein the switching controller comprises:
    a division unit dividing the power variation from the operator by the voltage variation;
    an integration unit integrating a result from the division unit; and
    a comparison unit supplying a switching control signal to increase a switching duty ratio of the converter section when the integration value from the integration unit is lower than a signal level of the reference signal, or a switching control signal to decrease a switching duty ratio when the integration value from the integration unit is higher than the signal level of the reference signal,
    wherein the reference signal is a sawtooth wave having a predetermined signal level.

4. The power supply of claim 1, wherein the converter section comprises:
    an inductor boosting a voltage level of the input power;
    a switch switching the power from the inductor according to the switching control signal;
    a diode rectifying the power switched by the switch;
    a capacitor stabilizing the power rectified by the diode.

5. The power supply of claim 1, further comprising: an inverter converting DC power from the converter section into predetermined AC power.

6. The power supply of claim 2, wherein the first and second sampling units sample the power value and the voltage value by using a sample and hold method.

7. The power supply of claim 1, wherein the input power is power input from a solar array, and the power supply is a solar photovoltaic generator.

* * * * *